US009808911B2

(12) United States Patent
Can et al.

(10) Patent No.: US 9,808,911 B2
(45) Date of Patent: Nov. 7, 2017

(54) POLYCRYSTALLINE ABRASIVE COMPACTS

(75) Inventors: Antionette Can, Sunward Park (ZA); Anna Emela Mochubele, Benoni (ZA); Geoffrey John Davies, Randburrg (ZA); Johannes Lodewikus Myburgh, Helderkruin (ZA)

(73) Assignee: ELEMENT SIX ABRASIVES S.A., Luxembourg (LU)

( * ) Notice: Subject to any disclaimer, the term of this patent is extended or adjusted under 35 U.S.C. 154(b) by 341 days.

(21) Appl. No.: 13/428,949

(22) Filed: Mar. 23, 2012

(65) Prior Publication Data
US 2012/0180401 A1 Jul. 19, 2012

Related U.S. Application Data

(62) Division of application No. 11/729,598, filed on Mar. 29, 2007, now Pat. No. 8,419,814.

(30) Foreign Application Priority Data

Mar. 29, 2006 (ZA) .................................. 2006/02580

(51) Int. Cl.
| | | |
|---|---|---|
| B05D 7/00 | (2006.01) | |
| B24D 3/14 | (2006.01) | |
| C03C 14/00 | (2006.01) | |
| C04B 35/5831 | (2006.01) | |
| C04B 35/628 | (2006.01) | |
| C04B 35/645 | (2006.01) | |
| C22C 26/00 | (2006.01) | |
| C22C 29/06 | (2006.01) | |
| C22C 29/12 | (2006.01) | |
| C22C 29/16 | (2006.01) | |
| E21B 10/567 | (2006.01) | |
| B24D 3/02 | (2006.01) | |

(52) U.S. Cl.
CPC ............. *B24D 3/14* (2013.01); *B24D 3/02* (2013.01); *C03C 14/004* (2013.01); *C04B 35/5831* (2013.01); *C04B 35/62818* (2013.01); *C04B 35/62821* (2013.01); *C04B 35/62823* (2013.01); *C04B 35/62831* (2013.01); *C04B 35/62836* (2013.01); *C04B 35/62884* (2013.01); *C04B 35/62886* (2013.01); *C04B 35/645* (2013.01); *C22C 26/00* (2013.01); *C22C 29/06* (2013.01); *C22C 29/12* (2013.01); *C22C 29/16* (2013.01); *E21B 10/567* (2013.01); *C03C 2214/05* (2013.01); *C03C 2214/32* (2013.01); *C04B 2235/3225* (2013.01); *C04B 2235/3232* (2013.01); *C04B 2235/3244* (2013.01); *C04B 2235/3251* (2013.01); *C04B 2235/386* (2013.01); *C04B 2235/441* (2013.01); *C04B 2235/465* (2013.01); *C04B 2235/5436* (2013.01); *C04B 2235/785* (2013.01); *C04B 2235/85* (2013.01); *C22C 2026/006* (2013.01)

(58) Field of Classification Search
CPC ............................................. C04B 2235/5436
USPC ......................................................... 427/337
See application file for complete search history.

(56) References Cited

U.S. PATENT DOCUMENTS

| | | | |
|---|---|---|---|
| 3,743,489 A | 7/1973 | Wentorf, Jr. et al. | |
| 3,745,623 A | 7/1973 | Wentorf, Jr. et al. | |
| 3,767,371 A | 10/1973 | Wentorf, Jr. et al. | |
| 4,334,928 A | 6/1982 | Hara et al. | |
| 5,213,591 A | 5/1993 | Celikkaya et al. | |
| 5,215,942 A * | 6/1993 | MacKenzie et al. ............ 501/12 |
| 5,304,533 A * | 4/1994 | Kobayashi .............. C04B 35/45 252/519.2 |
| 5,328,875 A | 7/1994 | Ueda et al. | |
| 5,418,197 A * | 5/1995 | Brandt ............................ 501/89 |
| 5,466,642 A | 11/1995 | Tajima et al. | |
| 5,628,806 A * | 5/1997 | Celikkaya et al. ............. 51/309 |
| 5,649,984 A * | 7/1997 | Sigalas et al. .................. 51/293 |
| 6,316,094 B1 | 11/2001 | Fukaya et al. | |
| 6,596,040 B2 * | 7/2003 | Saak et al. ...................... 51/307 |

FOREIGN PATENT DOCUMENTS

| | | |
|---|---|---|
| EP | 0 949 027 A | 10/1999 |
| EP | 0 950 455 A | 10/1999 |
| EP | 0 974 566 A | 1/2000 |
| EP | 0 975 566 B | 6/2004 |
| JP | 2000-044347 A | 2/2000 |
| JP | 2000-044350 A | 2/2000 |
| WO | WO 2006/032982 A | 3/2006 |
| WO | WO 2006/032984 | 3/2006 |
| WO | WO 2006/046124 A | 5/2006 |
| WO | WO 2007/020518 A | 2/2007 |
| WO | WO 2007/088461 A | 8/2007 |

OTHER PUBLICATIONS

Mauritz, K.: "Sol-Gel Chemistry", Internet Article, Jan. 6, 2006, http://www.psrc.usm.edu/mauritz/solgel.html.
International Search Report (WO 2007/110770 A3) dated Oct. 4, 2007 directed to corresponding International Application PCT/IB2007/000816.
English translation of official action issued by Japanese Patent Office for corresponding Japanese application 2009-502242 dated Aug. 27, 2012.

* cited by examiner

*Primary Examiner* — Tabatha Penny
(74) *Attorney, Agent, or Firm* — Haug Partners LLP

(57) ABSTRACT

A method of manufacturing polycrystalline abrasive elements consisting of micron, sub-micron or nano-sized ultrahard abrasives dispersed in micron, sub-micron or nano-sized matrix materials. A plurality of ultrahard abrasive particles having vitreophilic surfaces are coated with a matrix precursor material in a refined colloidal process and then treated to render them suitable for sintering. The matrix precursor material can be converted to an oxide, nitride, carbide, oxynitride, oxycarbide, or carbonitride, or an elemental form thereof. The coated ultrahard abrasive particles are consolidated and sintered at a pressure and temperature at which they are crystallographically or thermodynamically stable.

30 Claims, 3 Drawing Sheets

POLYCRYSTALLINE ABRASIVE COMPACTS

This application is a division of U.S. patent application Ser. No. 11/729,598 filed Mar. 29, 2007 entitled "Polycrystalline Abrasive Compacts" which claims priority benefits to South African Patent Application Number 2006/02580 filed Mar. 29, 2006, the entire disclosure of which is herein incorporated by reference.

BACKGROUND OF THE INVENTION

The present invention relates to a polycrystalline abrasive material.

Abrasive compacts are used extensively in cutting, milling, grinding, drilling and other abrasive operations. They generally contain ultra-hard abrasive particles dispersed in a second phase matrix or binder phase. The matrix or binder may be metallic or ceramic or a cermet. It may be continuous in three dimensions. The ultra-hard abrasive particles may be diamond, cubic boron nitride (cBN), silicon carbide or silicon nitride and the like. These particles may be bonded to each other during the high pressure and high temperature compact manufacturing process generally used, forming a polycrystalline mass, or may be bonded via the matrix of second phase material(s) to form a polycrystalline mass. Such bodies are generally known as polycrystalline diamond or polycrystalline cubic boron nitride, where they contain diamond or cBN as the ultra-hard abrasive, respectively.

Examples of diamond and cubic boron nitride abrasive compacts are described in U.S. Pat. Nos. 3,745,623; 3,767,371; 3,743,489; 4,334,928; 5,466,642 and 5,328,875.

Conventional sintered bodies will typically have a bonding phase with a thickness or mean free path that varies considerably throughout the bulk of the material. That is, there are regions which contain larger amounts of binding phase and regions which contain lesser amounts. This is typically characterized as lacking the property of homogeneity by those skilled in the art. This lack of consistency of material structure has obvious effects on the overall performance of the material in application.

European patent EP 0 974 566 B1 describes the use of metallurgical, scanning, transmission, and Auger electron microscopy to measure the thickness of the bonding phase in a cBN (cubic boron nitride) sintered body comprising cBN particles and a bonding phase that bonds the cBN particles. Direct measurement of the thickness of the bonding phase, by drawing an arbitrary straight line on the micrographs, and image analysis were used to determine the average and standard deviation values of the thickness of the bonding phase for a range of sintered materials.

In EP 0 974 566 B1, the standard deviation of the thickness of the bonding phase is employed as a metric for evaluating the effectiveness of different material mixing methods. The lower the standard deviation, the more effective the mixing method was in homogeneously distributing the bonding phase.

By enhancing the homogeneity of the polycrystalline compact of the present invention (i.e. the relative distributions of ultrahard abrasive particles and matrix or binder material) through optimising the method or route of manufacture, a material of improved properties can be achieved.

SUMMARY OF THE INVENTION

Figure 1:
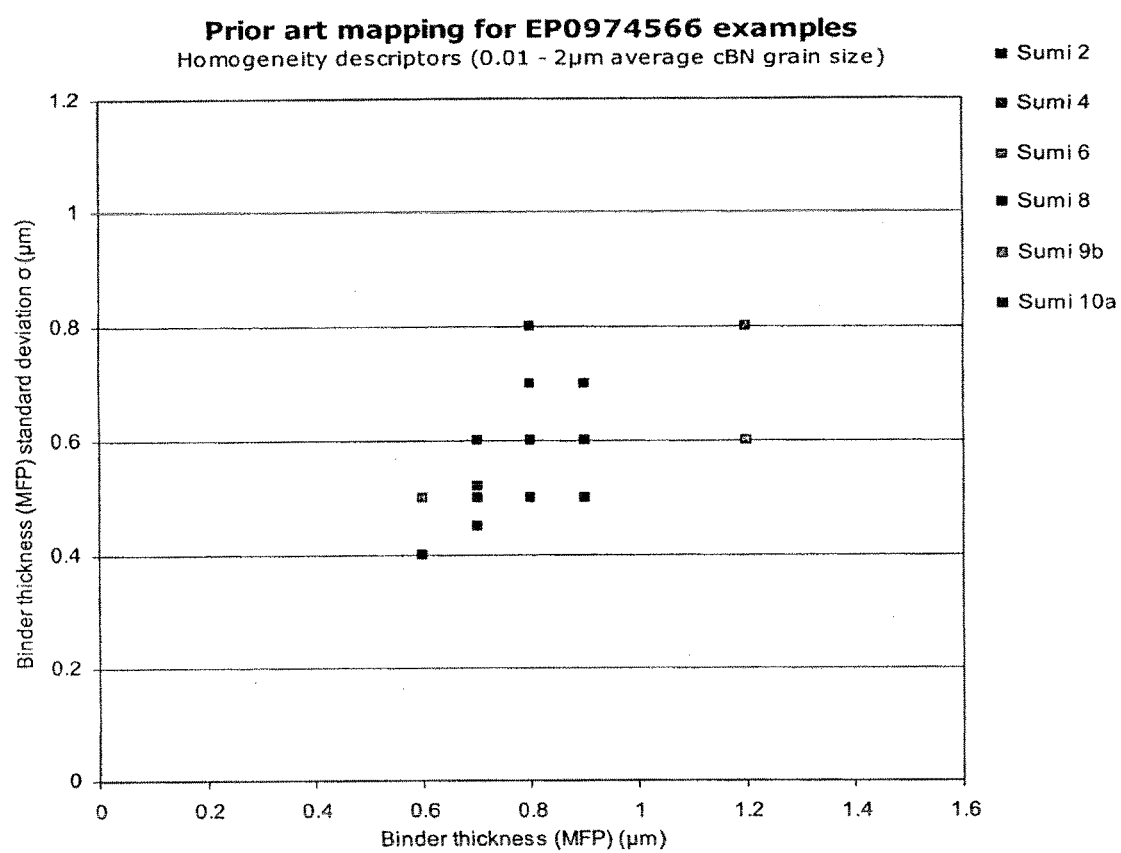
FIGS. 1 and 2 are plots of prior art examples from EP 0 974 566 (U.S. Pat. No. 6,316,094) for two different cBN grain size regimes.

According to one aspect of the invention, there is provided a polycrystalline ultrahard abrasive material comprising ultrahard abrasive particles in a matrix, the matrix having an average matrix or binder thickness of less than 0.5 µm and a standard deviation of 0.5 µm or less, typically in the range between 0.1 µm and 0.5 µm, preferably in the range between 0.1 µm and 0.45 µm. The average matrix or binder thickness values of this material are preferably in the range 0.1 µm to 0.5 µm.

According to another aspect of the invention, there is provided a polycrystalline ultrahard abrasive material comprising ultrahard abrasive particles in a matrix, the ultrahard abrasive particles having an average grain size of greater than 0.01 µm and the matrix having an average matrix or binder thickness of more than 0.5 µm, typically in the range between 0.5 µm and 1.5 µm, and which has a standard deviation of less than 0.4 µm, preferably less than 0.35 µm, and typically in the range between 0.1 and 0.35 µm.

According to yet a further aspect of the invention, there is provided a method of manufacturing a polycrystalline abrasive element, the method including the steps of providing a plurality of ultrahard abrasive particles having vitreophilic surfaces, coating the ultrahard abrasive particles in a suspension with a matrix precursor material in a sol-gel technique via the hydrolysis and polycondensation of alkoxides or alcoholates in the presence of deionised water, treating the coated ultrahard abrasive particles to render them suitable for sintering, and consolidating and sintering the coated ultrahard abrasive particles at a pressure and temperature at which they are crystallographically or thermodynamically stable, characterized in that the rate of hydrolysis and polycondensation of the coats on the ultrahard abrasive particles is controlled by very slow addition of the deionised water to the suspension.

The ultra-hard abrasive particles are preferably diamond or cubic boron nitride or a combination thereof.

DETAILED DESCRIPTION OF THE INVENTION

The invention relates to polycrystalline abrasive bodies and materials, also referred to as polycrystalline abrasive elements, for use as cutting tools for turning, milling and honing, drilling cutters for rock, ceramics and metals, wear parts and the like, and a method of making the same. The invention is particularly directed to improved homogeneous composite materials where the material phases present are micron, sub-micron and/or nano-grain so that the expected improvements in properties and behaviour in applications as a result of the use of such material phases can be exploited.

These materials exhibit improved properties, which result in enhanced behaviour in a range of applications where the composite abrasive bodies of the invention can be used. Many of the problems experienced in the prior art to do with lack of homogeneity in the microstructures, complexity of the compositional phases and impurities introduced are addressed by the invention.

The composite abrasive bodies are made up of micron, sub-micron, or nano-sized ultrahard abrasive particles dispersed in micron, sub-micron or nano-grain sized matrix materials.

For the purposes of this invention sub-micron particles or grains are defined as having their major diametric dimension between 1 micrometer (1000 nm) and 0.1 microns (100 nm), and nano-sized particles or grains as having their major diametric dimension smaller than 0.1 micron (100 nm).

The ultrahard abrasive particles include diamond, cubic boron nitride, silicon carbide, silicon nitride, boron carbide, boron suboxide ($B_6O$) and the like, and any combination of these particle types. Preferably the ultrahard particles are diamond or cubic boron nitride or a combination of these materials.

The matrix materials include but are not restricted to micron, sub-micron or nano-grain sized oxide, nitride, carbide, oxynitride, oxycarbide or carbonitride matrices. The sub-micron or nano-sized matrix materials include the oxides, nitrides, carbides, oxynitrides, oxycarbides and carbonitrides of aluminium, titanium, silicon, vanadium, zirconium, niobium, hafnium, tantalum, chromium, molybdenum and tungsten and any appropriate combination of these materials. Preferably these matrices will be nano-grain sized compounds of aluminium, titanium, tantalum, silicon or zirconium.

The composite abrasive bodies of the invention encompass compositional ratios of dispersed ultrahard particles to matrix material of from about 25% to in excess of 98% by volume, preferably greater than 70%, more preferably greater than 80%.

A key aspect of the method of the invention is that precursors for the desired matrix materials may be accurately coated on each individual ultrahard particle using optimized colloidal technology, so that each particle has substantially an identical dimensional and structural coat to all others. This enables a greater degree of structural homogeneity to be obtained which is significantly better than that obtainable with the methods of the prior art. This is possible for fine ultrahard particles of micron, sub-micron and even nano-sized dimensions because a distinct character of the method of the invention is that the precursor coating materials and subsequent final matrix materials brought about by chosen heat treatment procedures can be of a very fine nano-grain size. In turn this allows very high ultrahard particle contents above 90% by volume to be achieved, with good homogeneity.

The polycrystalline abrasive materials of the invention may be made by the processes generally described in International Patent Application no. PCT/IB2005/002799, the content of which is incorporated herein by reference, but which are optimized in accordance with the current invention.

The method of the invention encompasses generally four procedural components, viz, 1) providing ultrahard abrasive particles with vitreophilic surfaces or, where appropriate, chemically treating the ultrahard abrasive particle surfaces to render them vitreophilic; 2) employing colloidal suspension reaction methods to coat the ultrahard particles with a precursor material; 3) heat treating the so coated ultrahard particles in gaseous environments including those incorporating reaction gases to convert the coat to chosen oxides, nitrides, carbides, oxynitrides, oxycarbides and/or carbonitrides; and 4) high pressure, high temperature consolidation and sintering to generate fully dense fine structured and nano-structured composite material pieces.

In the first step, the surface chemistry of the ultrahard particulate material is manipulated to provide the particles with a vitreophilic nature. Vitreophilic, "glass loving", is defined as being of such a character that chemical bonds with oxide materials can readily be formed. Treatments that are capable of creating chemical species on the surface required for vitreophilic behaviour of the ultrahard particles include, but are not restricted to, boiling in oxidative acids such as concentrated nitric acid, where appropriate, or exposure to strong oxidizing agents such as hydrogen peroxide solutions or heating in air or oxygen. The surfaces so generated allow the formation and growth of oxide and hydroxide based coatings onto the particulate material and good adherence with the so formed oxide based precursor coatings.

In the second step, colloidal suspension coating of the ultrahard abrasive particles with amorphous and/or nano-grain sized, hydrated oxide precursor materials is employed. It has been found that optimisation of certain steps of the sol-gel processes of PCT/IB2005/002799 are capable of accurately coating micron, sub-micron and even nano-sized ultrahard material particles. The preferred sol-gel approach uses the hydrolysis and polycondensation of alkoxides or alcoholates. The precursor coatings generated by this method are micro-porous, amorphous or nano-grain sized hydrated oxides of high surface area. Sol-gel techniques, in particular, are highly versatile and amenable to the control of the heterogeneous nucleation and growth of extremely accurate coats of hydrated oxide precursor materials onto the surfaces of vitreophilic suspended particles, which may be as small as 10 nm in dimensions or even smaller.

The favoured sol-gel approach is to add an alcoholic solution of a metal alkoxide or combination of metal alkoxides slowly and in a controlled manner to a suspension of ultrahard material particles in the same alcohol. Thereafter a low concentration of pure/deionised water in the same alcohol is slowly added to the suspension. The metal alkoxides are hydrolyzed by the water to form metal hydroxide monomers, which in turn undergo polycondensation reactions that progressively form hydrated, oxide micro porous materials, referred to in this invention as the oxide precursor materials or coats. By appropriate choice of alcohol type, typically having the same alkyl groups as the alkoxide(s), concentration of suspended ultrahard particles, concentration of alkoxide solution in the alcohol, the alkoxide water ratio, temperature and the presence or absence of other agents such as acids or bases it is possible to control the formation of a coating of the oxide precursor on the suspended ultrahard particles. Each type of alkoxide used requires specific conditions to be employed to coat the suspended ultrahard particulate material in the desired coat.

An important aspect of this approach is that the byproducts of the alkoxide hydrolysis and polycondensation reactions are water, alcohols and hydroxide species on some of the free surfaces of the coating. All of these byproducts are readily removable by drying and low temperature heat treatment. Moreover the alkoxides themselves are readily available as high purity grades. The alkoxide sol-gel approach thus leads to very pure uncontaminated oxides. The final matrix materials can thus be made very pure relative to those generated by the prior art methods. Certainly the ubiquitous impurities introduced by milling/mixing methods are absent in the method of this invention.

Yet another very important aspect of the method of the invention is that a large scope of mixed precursor oxide materials may be made by simultaneously or sequentially employing more than one type of alkoxide based upon different metals. In this way the oxide precursor material so generated will be a mixed oxide with the different metals distributed on a molecular scale. Alternatively it is known that alkoxide complexes involving more than one metal can be made. These alkoxide complexes can be used in the method of the invention. Consequently the oxides, nitrides and carbides generated by the full use of the method of the invention can include mixed and alloyed phases. Further it is known that mixed metal alkoxide structures can be made. Use of such mixed metal alkoxides also leads to mixed metal precursor oxides and subsequently mixed metal composite matrix phases.

The use of mixtures of alkoxides or mixed alkoxides also allows the doping of the precursor and subsequent matrix materials with sintering and structure modification agents such a yttria, magnesia, and the like. A great deal of the established ceramic, cermet and metallurgical material science knowledge can thus be brought to bear in the making of the composite materials via the method of the invention.

After removal from suspension and washing the coated particles are slowly dried by, for example, heating in a vacuum below 100° C. The micro-porous, amorphous or nano-grain sized structure of the precursor coat materials renders them ideal for temperature programmed reaction heat treatments in gaseous reactants or environments in order to form desired fine grained and nano-grain sized ceramic and other materials as components of the composite materials.

In the third step, temperature programmed reaction heat treatments of the precursor coated ultrahard particles in chosen gaseous environments is employed to partially densify the coat and to convert it to a chosen fine or nano-grain sized ceramic material. Heat treatment in air or oxygen is employed to calcine, partially densify the coat, drive off any remaining water and alcoholic component and crystallize the coat as a desired oxide phase. Choice of heating rate, top temperature and duration of top temperature is specific to the structure, phase and type of oxide required.

If it is desired to convert the coat into a nitride the dried or air calcined coated material may be heated in dry ammonia at temperatures typically up to 1100° C., although temperatures up to and including those of about 1400° C. may be necessary in certain applications. It has been found that this temperature programmed reaction treatment progressively reduces the coat material and is capable of converting the oxide base coats to stoichiometric and non-stoichiometric nitrides and oxynitrides. Again choice of heating rate, gas flow rates, top temperature and duration of top temperature is specific to the structure, phase and type of nitride required.

It has also been found that oxynitride phases can be generated by appropriate choice of the conditions.

If it is desired to convert the coat into a carbide, the dried or air calcined coated material may be heated in a mixture of carbonaceous gas such as methane or ethane and hydrogen at temperatures typically below 1200° C., although temperatures up to and including 1500° C. may be necessary in certain applications. Again choice of heating rate, gas flow rate, top temperature and duration of top temperature is specific to the structure, phase and type of carbide required. It has also been found that oxycarbide phases can be generated by appropriate choice of the conditions. Alternatively, it has been found that the nitride coats generated as described above can be converted to carbides by appropriate heat treatment in methane or ethane hydrogen mixtures. Carbonitride phases can be generated by choice of conditions.

Some of the oxide coats may readily be reduced to the corresponding elemental metal by reduction in pure hydrogen. Examples of such coats are tungstic and molybdic oxides, $WO_3$ and $MoO_3$, which may readily be reduced to the metals at low temperatures in the typical range of 500 to 700° C.

A key aspect of the temperature programmed reaction component of the method of the invention is that it was observed that the grain sizes of the resulting oxide, nitride, carbide coatings on the ultrahard particles were typically all nanometers in dimensions. Moreover another valuable aspect of these heat treatments was that the required temperatures and times to effect the conversions were low and short, respectively, when compared to the temperatures and times required for analogous conversions of conventional oxide materials made by melt or fusion techniques. In some cases of nitride formation temperatures as much as 400° C. lower were required for the method of the invention as compared to the nitriding of conventional oxide materials. Further the coated ultrahard particles can be separate and unagglomerated. This aids in the homogeneity of structures obtained during the subsequent high pressure, high temperature consolidation, sintering stage to follow.

In the fourth step, high temperature consolidation and sintering are employed at temperatures and pressures where the ultrahard particle materials are thermodynamically and chemically stable to create fully dense or near fully dense micron, sub-micron and nano-sized composite monolithic material pieces. For the preferred ultrahard materials of diamond and cBN these conditions were in the ranges of 2.5 GPa to 8 GPa and 600° C. to 1800° C. The dense composite materials so generated can also be bonded to metal carbide substrates in situ during the consolidation and sintering. The high pressure high temperature apparatus used can be any of those known in the art capable of generating appropriate conditions.

It has been found, in one form of this method, that by careful control of particularly the coating and consolidation steps it is possible to achieve novel materials with structures of extremely high homogeneity as determined by the standard deviation of the general binder or matrix thickness method of EP 0 974 566 B1. Typically this optimisation focuses on further aspects of controlling the reaction kinetics for the so-called sol-gel reaction through factors such as:

balancing of the relative concentrations of the ultrahard particles and the matrix precursor formation materials;
  manipulating the 3-dimensional temporal exposure of the matrix precursor material to the ultrahard particle surface; and
  controlling the reaction rate by changing aspects such as pH and other solution-based factors and parameters.

In particular it has been found that better control over reaction rates and increased particle-to-particle reproducibility of the coating of the ultrahard particles can be achieved by using approaches which aid in slowing the rate of the sol-gel reaction or improving the manner in which the ultrahard particle surface is exposed to the sol-gel reagents.

More homogenous final structures can be achieved by, for example, reducing the rate at which reagents (typically alkoxide and deionised water) are added to the plurality of ultrahard particles. This may take the form of an effective slower addition of the reagents to the ultrahard particle suspension by adding these drop-wise or batch-wise over time periods extending to several hours, e.g. 2 hours or more, and/or be achieved through manipulation of the reaction process e.g. by adding the aqueous phase later in the reaction steps, again drop-wise or batch-wise. Additionally, the concentration of reagents in the alcohol suspension medium can be reduced, such that (for example):

the ratio of deionised water to the diluting alcoholic suspension is kept to below 1 (or below 0.1 moles of water per ml of pure alcohol); and the concentration of alkoxide to dry alcoholic suspension is kept to below 0.005 moles of alkoxide per ml of dry alcohol.

Additionally, the use of far more vigorous and effective ultrasound methods to disperse the ultrahard particles in the reagent solution tends to result in composites with improved structural character. Ultrasonicating the ultrahard particle-alcoholic suspension with a high power source with increased diameter horn (40 mm) has been found to be effective in dispersing and deagglomerating the ultrahard particles; which have been found to be particularly prone to agglomeration. Pivotal to this method is the additional step of allowing the suspension, which experiences a significant temperature increase as a result of the high energy ultrasonication treatment, to cool to room temperature before proceeding with the reaction. If the solution is not allowed to cool before proceeding, then the reaction rates can tend to be too rapid to result in a composite material of sufficiently homogenous character.

Additionally, it has been found advantageous to reduce the concentration of ultrahard abrasive particles in alcoholic-based suspension to, for instance, below 0.2 g/ml; and to use a molar ratio of deionised water to precursor-derived oxide phase that is greater than 3:1.

Figure 2:
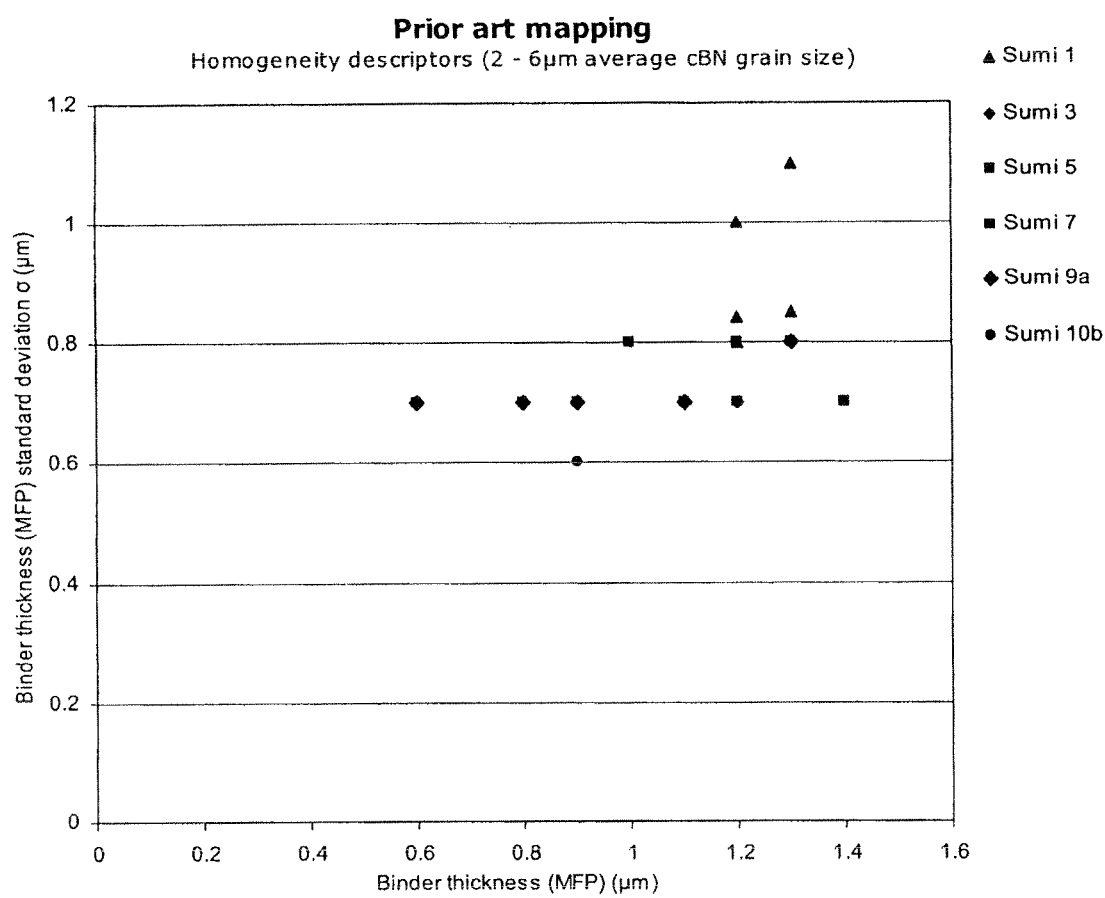

FIGS. 1 and 2 of the accompanying drawings show the prior art examples (for two different cBN grain size regimes) from EP 0 974 566, plotted as a function of the binder thickness average value and the standard deviation of that average value. The range name "Sumi 2" refers to those samples discussed in Example 2 from the patent; the range name "Sumi 10" to those discussed in Example 10 and so on.

The polycrystalline abrasive materials of the present invention have a much reduced standard deviation of the average binder thickness value over those indicated in the prior art.

Typically the distribution of the binder or matrix phase can be expressed statistically by the average value of the binder thickness; and the standard deviation value associated with the same. The average binder thickness value effectively represents the character of the distribution of the binder phase(s) within the composite material. By defining the overall binder content and the ultrahard particle size and distribution, this value is effectively geometrically determined. The standard deviation of this value, however, is an excellent descriptor for homogeneity. The wider the distribution of binder thicknesses (i.e. the larger the standard deviation value), the less homogenous is the material. The narrower the distribution, or lower the standard deviation value, the more homogenous is the material.

There is a further practical effect to be considered. It is typically difficult to achieve reduced binder thickness (and hence reduced binder or matrix content) without compromising on material performance because of the inherent lack of homogeneity which results in portions of the material having insufficient binder phase to facilitate effective consolidation. It has been found that it is possible to produce materials with average binder phase thicknesses of no more than 0.5 µm, but greater than 0.1 µm; where the properties have not been compromised due to difficulties in consolidation by coupling these reduced binder thickness average values with far reduced standard deviation values, typically 0.5 µm or less. A most preferred arrangement is where the standard deviation has a value of greater than 0.1 µm, but not more than 0.45 µm.

Figure 3:
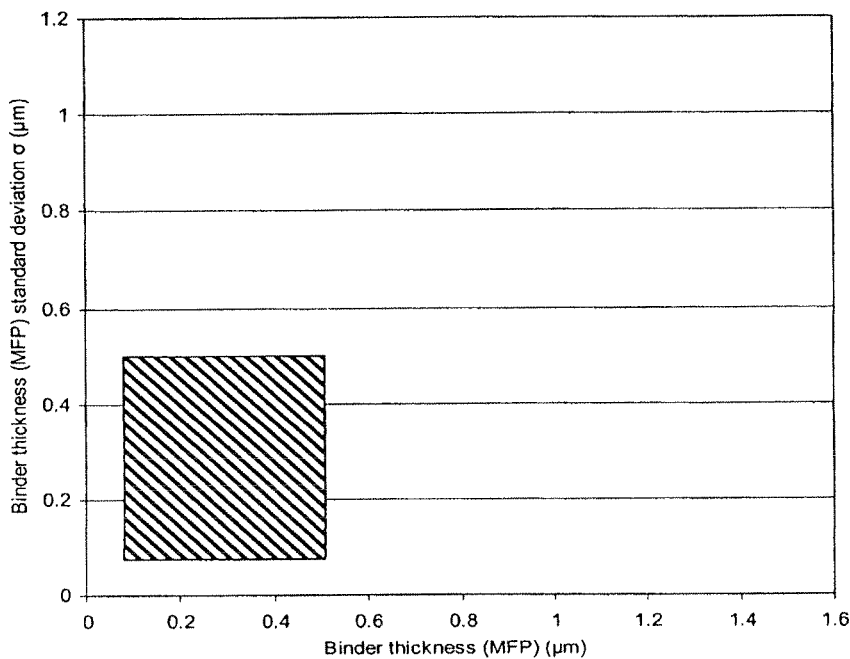
FIG. 3 is a plot of the range of preferred materials according to a preferred embodiment of the invention.

FIG. 3 shows, in crosshatch, the range of preferred materials of the invention which have a binder thickness value of between 0.1-0.5 µm and a standard deviation of between 0.1-0.5 µm.

Figure 4:
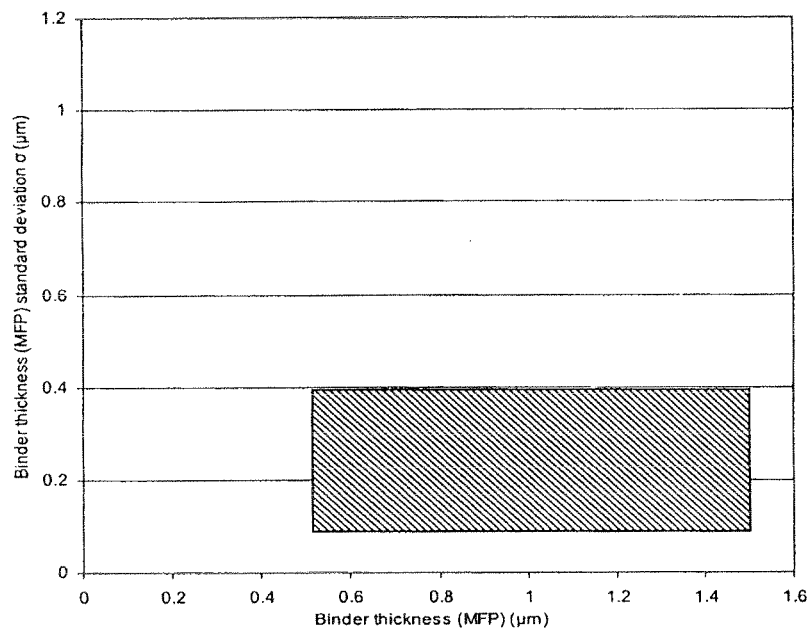
FIG. 4 is a plot of the range of preferred materials according to another preferred embodiment of the invention.

In addition, a further aspect of the invention is directed to materials which may have a higher binder content, expressed as an increase in the average binder thickness value over 0.5 µm; but still retain the increased homogeneity of the present invention (expressed as a reduced standard deviation value). This material lies in excess of 0.5 µm average binder thickness up to about 1.5 µm; together with a reduced standard deviation of between 0.1 and 0.4 µm, preferably between 0.1 and 0.35 µm. These materials have particular merit where the binder system has significantly advantageous properties which can be coupled with a highly homogenous distribution of ultrahard abrasive particles. FIG. 4 shows, in crosshatch, the range of materials according to this aspect of the invention.

This invention will now be illustrated by way of the following non-limiting examples:

Example 1

100 g of cubic boron nitride, of average particle size 1.3 µm, was cleaned in HCl to remove surface contamination. As taught in Internation Patent Application PCT/IB2005/002799, the cBN particle surfaces were made vitreophilic. 53.7 g of cBN was then suspended in 700 ml of pure ethanol in a beaker. The suspension was ultrasonicated for 20 minutes, using a large horn (diameter 40 mm) at sufficiently high power to deagglomerate the cBN particles. The suspension was then vigorously stirred with a paddle stirrer at about 100 rpm.

50 g of tantalum (V) ethoxide liquid, $Ta(OC_2H_5)_5$, was dissolved in 75 ml of anhydrous ethanol. After allowing the cBN suspension to cool to room temperature (post-ultrasonication), the $Ta(OC_2H_5)_5$ was added drop-wise to the cBN suspension over a period of 2 hours. 35.25 g of titanium iso-propoxide liquid, $Ti(OC_3H_7)_4$, was then dissolved in 75 ml of anhydrous ethanol and added dropwise to the cBN suspension over an additional period of 2 hours.

44 ml of deionised water was diluted in 200 ml of AR ethanol and added to the cBN suspension over a period of 2 hours. The suspension and reagents were maintained at room temperature (approximately 25° C.) and not heated to keep reaction rates low. Stirring was continued for a further 16 hours. The resulting plurality of coated particles was then washed three times with pure ethanol and was then dried in a rotary evaporator. Further drying was then done in an oven kept at 750° C. for 2 days. On examination in the Scanning Electron Microscope (SEM) and using EDS, it was observed that each cBN particle had been completely coated with an initimate mixture of titanium and tantalum oxide compounds, expected to be micro-porous, amorphous titania, $TiO_2$ and tantala, $Ta_2O_5$.

This oxide coated cBN was then heat treated in air at 400° C. for 3 hours. The heating rate and cooling rates were kept at 5° C. per minute. 60 g of the air heat-treated titania and tantala coated sub-micron cBN particles were then further heated at 1000° C. for 5 hrs in a tube furnace while being exposed to a flow of dry ammonia gas, $NH_3$. The heating rate used was 10° C. per minute. XRD investigation showed that this heat treatment in ammonia converted the nano-grain sized titania and tantala coat into a nano-grain sized titanium nitride, TiN and tantalum nitride, TaN.

About 45 g of the nano-grain sized TiN/TaN combination coated cBN was then subjected to a temperature of about 1400° C. at a pressure of about 5.0 GPa, for 20 minutes, in a belt type high pressure apparatus well known in the art.

A crack free polycrystalline cBN material of about 84% by volume of cBN in a continuous TiN/TaN matrix was produced. On SEM examination the resultant material was seen to be a simple well-sintered, homogenous dispersal of sub-micron cBN particles in a matrix of TiN/TaN matrix. Measurement of the binder phase as per the methods described previously showed an average binder mean free path for this composite of 0.25 μm, with a standard deviation on this value of 0.23 μm.

Example 2

Cubic boron nitride with an average particle size of 1.3 μm was acid-treated as described in Example 1. 250 g of the acid-treated cBN powder was suspended in 2000 ml of pure ethanol. This cBN suspension was ultrasonicated with a large horn ultrasonic probe (40 mm diameter) for 20 minutes, to deagglomerate the cBN particles, followed by vigorous mechanical stirring with a paddle-type stirrer (100 rpm). It was then allowed to cool to room temperature before proceeding. 221.7 g of zirconium (IV) n-propoxide (70% w/w in n-propanol), with the chemical formula, $Zr[O(CH_2)_2CH_3]_4$, was dissolved in 200 ml of dry ethanol. The alkoxide solution was added to the stirred cBN suspension, at room temperature, drop-wise over 2 hours.

In a separate dropping funnel, 7.4 g of yttrium nitrate hexahydrate, $Y(NO_3)_3.6H_2O$, was dissolved in 150 ml dry ethanol. After the addition of the zirconium n-propoxide the $Y(NO_3)_3.6H_2O$ was added to the cBN suspension over a period of 1 hour. This was followed by the dropwise addition of 187 ml deionised water in 200 ml of pure ethanol, over 2 hours. The mixture was then stirred overnight (approximately 16 hours), maintained at room temperature throughout the experiment to reduce reaction rates.

The zirconium oxide coated cBN was washed three times with pure ethanol and rotavapor dried under a vacuum between 600 and 390 mbar and a temperature between 70 and 80° C. The resultant powder was additionally dried in air at 75° C. for 2 days. This dried powder was subsequently heat treated in static air. The heat treatment cycle used was as follows: 2° C./min up to 350° C., dwelling at 350° C. for 1 hour, followed by a ramp up to 500° C. at 2° C./min and dwelling at 500° C. for 5 hours.

XRD analysis of the heat treated powder showed that the powder consisted of crystalline cubic boron nitride and tetragonal zirconia phases. The tetragonal zirconia coated cBN powder was then hot pressed at a temperature of about 1400° C. and a pressure of approximately 5 GPa for 20 minutes in a belt-type high pressure/high temperature press. This produced a homogeneous cBN-zirconia composite material.

SEM examination of the resulting well-sintered composite material showed that the distribution of binder and ultrahard particle phases was extremely homogenous, where the binder mean free path measurement, as previously described, had an average value of 0.22 μm and a standard deviation on this measurement of 0.23 μm.

We claim:

1. A method of manufacturing a polycrystalline ultrahard abrasive material including the steps of
   providing a plurality of ultrahard abrasive particles selected from the group consisting of diamond and cubic boron nitride,
   manipulating the surface chemistry of the ultrahard abrasive particles to render the surfaces of the particles to be vitreophilic, the vitreophilic surfaces to form chemical bonds with oxides, the vitreophilic surfaces comprising any of oxides and hydroxides of the material of the ultrahard abrasive particles,
   colloidal suspension coating the manipulated surfaces of the ultrahard abrasive particles in a suspension with a matrix precursor material via the hydrolysis and polycondensation of alkoxides in the presence of deionised water, thereby to grow coats of hydrated oxide precursor materials onto the surfaces of the vitreophilic suspended particles, the deionised water being added to the suspension over a period of at least one hour,
   treating the coated ultrahard abrasive particles to render them suitable for sintering, and
   consolidating and sintering the coated ultrahard abrasive particles at a pressure and temperature at which they are crystallographically or thermodynamically stable.

2. A method according to claim 1, wherein the deionised water is added to the suspension over a period of at least two hours.

3. A method according to claim 1, wherein the ultrahard abrasive particles are suspended in an alcohol and at least one alkoxide or solution of the alkoxide(s) in the same alcohol is introduced to form colloidal entities that bond to the surfaces of the respective particles and build up into coatings on the particles.

4. A method according to claim 1, wherein the alkoxide is an alkoxide of an element chosen from aluminium, titanium, silicon, zirconium, vanadium, niobium, tantalum, chromium, molybdenum, tungsten, hafnium and yttrium.

5. A method according to claim 1, wherein two or more alkoxides are introduced into the suspension, which are selected from alkoxides of the elements aluminium, titanium, silicon, zirconium, vanadium, niobium, tantalum, chromium, molybdenum, tungsten hafnium and yttrium.

6. A method according to claim 1, wherein a mixed alkoxide compound or complex, incorporating two or more of the elements aluminium, titanium, silicon, zirconium, vanadium, niobium, tantalum, chromium, molybdenum, tungsten, hafnium and yttrium, is introduced into the suspension.

7. A method according to claim 1, wherein the alcohol has the same alkyl group as the alkoxide(s).

8. A method according to claim 1, wherein the matrix precursor material coats are substantially micro-porous.

9. A method according to claim 1, wherein the coated ultrahard abrasive particles are treated to convert the matrix precursor material to an oxide, nitride, carbide, oxynitride, oxycarbide, or carbonitride of the matrix precursor material, or an elemental form of the matrix precursor material, or combinations thereof.

10. A method according to claim 9, wherein the converted matrix precursor material is selected from micron, submicron or nano-grain sized oxides, nitrides, carbides, oxynitrides, oxycarbides and carbonitrides of the matrix precursor materials, or elemental matrix precursor materials, or combinations thereof.

11. A method according to claim 9, wherein the converted matrix precursor material is selected from the oxides, nitrides, carbides, oxynitrides, oxycarbides and carbonitrides of aluminium, titanium, silicon, vanadium, zirconium, niobium, hafnium, tantalum, chromium, molybdenum and tungsten and any appropriate combination of these materials.

12. A method according to claim 1, wherein the matrix precursor material is an amorphous or nano-crystalline oxide, hydroxide or oxo-hydroxide.

13. A method according to claim 1, wherein the ultrahard abrasive particles are diamond or cubic boron nitride, or a combination of these materials, and wherein the particles are treated in a surface treatment process in order to render the surfaces thereof vitreophilic.

14. A method according to claim 1, wherein the matrix precursor material is an amorphous or nano-grain sized compound of aluminium, titanium, silicon, vanadium, zirconium, niobium, hafnium, tantalum, chromium, molybdenum and tungsten and any appropriate combination of these materials.

15. A method according to claim 1, wherein the converted matrix precursor material is an elemental form of tungsten, molybdenum or a combination or alloy of these metals.

16. A method according to claim 1, wherein the elemental form of the converted matrix precursor material is nano-grain sized tungsten, molybdenum or a combination or alloy of these metals.

17. A method according to claim 1, wherein the coated ultrahard abrasive particles are subjected to temperature controlled heating in air, vacuum or inert gas to remove volatiles and unwanted chemical species attached to surface area of the micro-porous, amorphous coats.

18. A method according to claim 17, wherein the coated ultrahard abrasive particles are subjected to further heat treatment or calcination to crystallize the coats to form fine grained or nano-size grained oxide ceramics.

19. A method according to claim 17, wherein the coated ultrahard abrasive particles are subjected to further heat treatment to vitrify the coats to form glasses.

20. A method according to claim 17, wherein the coated ultrahard abrasive particles are subjected to temperature controlled reactions in reactive gases to convert the coat materials into non-oxide ceramics or glasses.

21. A method according to claim 20, wherein nitrides are formed by reacting the coats with ammonia gas.

22. A method according to claim 20, wherein carbides are formed by reacting the coats in mixtures of carbonaceous gases and hydrogen.

23. A method according to claim 22, wherein the carbides are formed by reacting the coats in a mixture of methane or ethane and hydrogen.

24. A method according to claim 17, wherein the coated ultrahard abrasive particles are subjected to temperature controlled reactions in reactive gases to convert the coat materials into oxynitride or oxycarbide ceramics or glasses.

25. A method according to claim 24, wherein the oxide coats are reducible by hydrogen and are converted into micro or nano-grain sized elements or metals.

26. A method according to claim 1, wherein the coated ultrahard abrasive particles are consolidated, compacted and the coats sintered by hot pressing.

27. A method according to claim 1, wherein the coated ultrahard abrasive particles are consolidated, compacted and sintered under conditions of high pressure and temperature.

28. The method of claim 1, wherein manipulating the surface chemistry is selected from the group consisting of boiling the particles in oxidative acids, exposure to an oxidizing agent, and heating in air or oxygen.

29. The method of claim 28, wherein the oxidative acids are concentrated nitric acid.

30. The method of claim 28, wherein the oxidizing agents is hydrogen peroxide solutions.

\* \* \* \* \*